United States Patent Office 3,320,240
Patented May 16, 1967

3,320,240
ALPHA-CARBOXYACYLAMINO PENICILLINS
George Robert Fosker, Horsham, John Herbert Charles Nayler, Dorking, and Harry Smith, Maplehurst, near Horsham, England, assignors to Beecham Group Limited, Brentford, England, a British company
No Drawing. Filed Aug. 17, 1965, Ser. No. 480,477
Claims priority, application Great Britain, Sept. 3, 1964, 36,206/64
5 Claims. (Cl. 260—239.1)

This invention relates to new penicillins and is particularly concerned with a new class of penicillins which are derivatives of 6-aminopenicillanic acid and which are of value as antibacterial agents, as nutritional supplements in animal food, as agents for the treatment of mastitis in cattle and as therapeutic agents in poultry and animals, including man, in the treatment especially of infectious diseases caused by Gram-positive and Gram-negative bacteria.

According to the present invention there is provided new penicillins of the general formula:

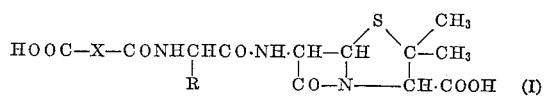

and non-toxic salts thereof, where R is an alkyl, aralkyl, aryl or heterocyclic group which may be substituted and X is a direct linkage or a divalent aliphatic, aromatic or heterocyclic radical which may be substituted.

The salts are non-toxic salts including non-toxic metallic salts such as sodium, potassium, calcium and aluminum, ammonium and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N' - bis-dehydroabietylethylenediamine, and other amines which have been used to form salts with benzylpenicillin.

The new penicillins of the present invention may be prepared by reacting an α-aminopenicillin of the general formula:

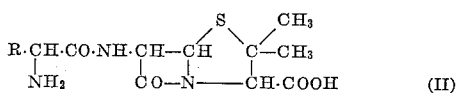

with a reactive derivative of the dicarboxylic acid HOOC—X—COOH where R and X are as hereinbefore defined. Examples of suitable reactive derivatives include the cyclic anhydrides

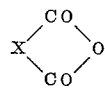

the mono- and bis-acid chlorides and the mono- and bis-mixed anhydrides.

Alternatively, the new penicillins may be prepared by the catalytic hydrogenation of an intermediate penicillin (III) containing a protected carboxyl group

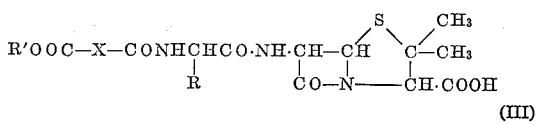

where R' is a benzyl or substituted benzyl group and R and X are as hereinbefore defined.

The intermediate or protected penicillin (III) is prepared either by reacting the α-aminopenicillin (II) with a reactive derivative of the acid R'OOC—X—COOH (IV) or by reacting 6-aminopenicillanic acid with a reactive derivative of the acid

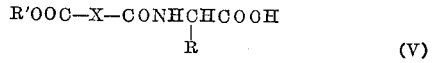

Such reactive derivatives of the acids (IV) and (V) include the chlorides, bromides, azides, anhydrides, mixed anhydrides, and the intermediates formed from the acids and a condensing agent as dicyclohexylcarbodiimide or carbonyldiimidiazole.

The novel penicillins of the present invention are mostly capable of existing in two epimeric forms and it is to be understood that the invention includes both the D- and L-forms as well as the DL-mixture.

The following examples illustrate the invention:

EXAMPLE 1

Sodium 6[D-α-(o-carboxybenzamido)phenylacetamido]penicillanate

A solution of phthalic anhydride (3 g.) in methylene dichloride (25 ml.) was added slowly with stirring to a chilled solution prepared from anhydrous 6[D(—)-α-aminophenylacetamido]penicillanic acid (7 g.), methylene dichloride (50 ml.), and triethylamine (8.4 ml.). The mixture was stirred at room temperature for 2½ hours, then diluted with dry ether until formation of an oily precipitate appeared to be complete. The precipitate solidified when triturated with more ether, and was then collected and dissolved in water (25 ml.). The aqueous solution was covered with methyl isobutyl ketone (25 ml.) and treated with dilute hydrochloric acid to pH 1.5 with stirring. The layers were separated and the solvent phase, which contained the free acid form of the required penicillin, was washed with water (2× 20 ml.) and then with saturated brine (25 ml.). The sodium salt of the penicillin was then precipitated by adding a 2 N solution of sodium 2-ethylhexoate in methyl isobutyl ketone. The precipitate was collected and washed first with methyl isobutyl ketone, then with dry ether, and dried in a vacuum desiccator. The product (4.3 g.) was estimated by colorimetric assay with hydroxylamine to be 69% pure. When subjected to paper chromatography it gave a single zone of antibacterial activity having a different $R_F$ value from that of the starting penicillin.

EXAMPLE 2

Sodium 6[D-α-(β-carboxypropionamido)phenylacetamido]penicillanate

The experiment described in Example 1 was repeated, except that succinic anhydride (2 g.) was used instead of phthalic anhydride. The yield of the sodium salt of the resulting penicillin was 4.2 g., and the purity was estimated by colorimetric assay with hydroxylamine to be about 88%.

EXAMPLE 3

Sodium 6[D-α-(β-carboxyacrylamido)phenylacetamido]penicillanate

The experiment described in Example 1 was repeated, except that the phthalic anhydride reagent was replaced by maleic anhydride (2 g.) dissolved in dioxane (30 ml.). The yield of the sodium salt of the resulting penicillin was 6.7 g., and the purity was estimated by colorimetric assay with hydroxylamine to be about 90%.

EXAMPLE 4

Sodium 6[α-(o-carboxybenzamido)-3-thienylacetamido]penicillante

This penicillin was prepared as described in Example 1 but starting with 6 (α-amino-3-thienylacetamido)

penicillantic acid instead of 6[D(—)-α-aminophenylacetamido]penicillanic acid.

EXAMPLE 5

*Sodium 6[α-(β-carboxypropionamido)-2-furylacetamido]penicillanate*

This penicillin was prepared as described in Example 2 but starting with 6(α-amino-2-furylacetamido)penicillanic acid instead of 6[D(—)α-aminophenylacetamido]penicillanic acid.

EXAMPLE 6

*Sodium 6[D-α-(γ-carboxybutyramido)phenylacetamido]penicillanate*

A solution of glutaric anhydride (2.3 g.) in tetrahydrofuran (50 ml.) was added to a stirred solution of 6[D(—)-α-aminophenylacetamido]penicillanic acid trihydrate (8.06 g.) and triethylamine (2.84 ml.) in water 50 ml.). The solution was stirred for 2 hours at room temperature and the pH maintained at 7 to 7.5 by additions of triethylamine. The reaction mixture was evaporated ot a half volume at reduced pressure and temperatures below 20° C. It was covered with isobutyl methyl ketone (25 ml.) and sufficient 5 N hydrochloric acid was added so that after shaking the pH was 2. This was repeated once more. The combined organic extracts were washed with water (2× 100 ml.) and then with saturated brine (2× 100 ml.) and filtered through a siliconised filter paper. The filtrate was added dropwise with stirring to a 0.01 N solution (2 litres) of sodium 2-ethylhexoate in diethyl ether. A solid precipitated which was filtered off after 30 minutes and well washed with diethyl ether and dried in vacuo over phosphorus pentoxide. The product (9.2 g.) was estimated by manometric penicillinase assay to be 71% pure. When subjected to paper chromatography it gave a single zone of antibacterial activity having a different $R_f$ value from that of the starting penicillin.

EXAMPLE 7

*Sodium 6[D-α-(carboxymethoxyacetamido)phenylacetamido]penicillanate*

The experiment described in Example 6 was repeated, except that the glutaric anhydride was replaced by diglycolic anhydride (2.32 g.). The yield of the sodium salt of the resulting penicillin was 6.8 g., and the purity was estimated by colorimetric assay with hydroxylamine to be 63%.

EXAMPLE 8

*Sodium 6[D-α-(2-carboxypyridine-3-carbamido)phenylacetamido]penicillanate and sodium 6[D-α-(3-carboxypyridine-2-carbamido)-phenylacetamido]penicillanate*

The experiment described in Example 1 was repeated, except that pyridine-2,3-carboxyanhydride (3.0 g.) was used instead of phthalic anhydride. The yield of the mixed penicillins, as their crude sodium salts, was 7.0 g.

EXAMPLE 9

*Sodium 6[D-α-(3-carboxypyrazine-2-carbamido)phenylacetamido]penicillanate*

The experiment described in Example 1 was repeated, except that pyrazine-2,3-carboxyanhydride (3.0 g.) was used instead of phthalic anhydride. The yield of the sodium salt of the resulting penicillin was 6.9 g.; and the purity was estimated by manometric penicillinase assay as 74%. A sample when submitted to paper chromatography showed a single zone of antibiotic activity.

EXAMPLE 10

*Sodium 6[D-α-(β-carboxy-α,β-dichloro-acrylamido)phenylacetamido]penicillanate*

A solution of dichloromaleic anhydride (1.7 g.) in acetone (25 ml.) was added slowly with stirring to a chilled solution of 6[D(—)-α-aminophenylacetamido]penicillanic acid trihydrate (4.0 g.), water (50 ml.), and triethylamine (1.4 ml.) The clear solution was stirred at room temperature for 1½ hours, extracted with three portions of diethyl ether (3× 100 ml.) and the aqueous phase covered with methyl isobutyl ketone (50 ml.) and treated with dilute hydrochloric acid to pH 1.5 with stirring. The sodium salt (1.6 g.), estimated by colorimetric assay with hydroxylamine to be 73% pure, was then isolated as described in Example 1.

EXAMPLE 11

*Sodium 6[D-α-(o-carboxyphenylacetamido)phenylacetamido]penicillanate and sodium 6[D-α-(o-carboxymethylbenzamido)phenylacetamido]penicillanate*

The experiment described in Example 10 was repeated except that homophthalic anhydride (1.6 g.) was used in place of dichloromaleic anhydride. The yield of the mixed penicillins, as crude sodium salts, was 2.8 g.

EXAMPLE 12

*Sodium 6[D-α-(m-carboxybenzamido)phenylacetamido]penicillanate*

A solution of isophthaloyl chloride (2.0 g.) in methyl isobutyl ketone (50 ml.) was added in a thin steady stream to a vigorously stirred aqueous solution of 6[D(—)-α-aminophenylacetamido]penicillanic acid trihydrate (4.0 g.), water (50 ml.) and triethylamine (1.4 ml.). After stirring at room temperature for 2 hours, the phases were separated and the organic phase washed with water (3× 50 ml.) followed by saturated brine solution (2× 50 ml.). The sodium salt of the penicillin was then precipitated by adding a 2 N solution of sodium 2-ethyl hexoate in methyl isobutyl ketone. The precipitate was collected and washed first with methyl isobutyl ketone, then with dry ether, and dried in a vacuum desiccator.

The product (3.1 g.) was estimated by colorimetric assay with hydroxylamine to be 83% pure. When subjected to paper chromatography it gave a single zone of antibacterial activity.

EXAMPLE 13

*Sodium 6[D-α-(5-carboxypyrazone-3-carbamido)phenylacetamido]penicillanate*

The experiment described in Example 12 was repeated except that pyrazole-3,5-di-carboxychloride (1.9 g.) was used instead of isophthaloyl chloride. The yield of the sodium salt of the resulting penicillin was 2.5 g.; the purity was estimated by manometric penicillinase assay to be 83%. When subjected to paper chromatography it gave a single zone of antibacterial activity.

EXAMPLE 14

*Sodium 6[D-α-(2-carboxy-3-nitrobenzamido)phenylacetamido]penicillanate*

The experiment in Example 1 was repeated except that 3 nitro phthalic anhydride (3.8 g.) was used instead of phthalic anhydride. The yield of the sodium salt of the resulting penicillin was 1.4 g., the purity was estimated by colorimetric assay with hydroxylamine to be 66%.

EXAMPLE 15

*Sodium 6[L-α-(β-carboxyacrylamido)-m-hydroxyphenylacetamido]penicillanate*

The experiment in Example 1 was repeated except that maleic anhydride (0.5 g.) and 6[L(+)-α-amino-m-hydroxyphenylacetamido]penicillianic acid (1.8 g.) were used instead of phthalic anhydride and 6[D(—)-α-aminophenylacetamido]penicillanic acid. When subjected to paper chromatography the product gave a single zone of antibacterial activity.

EXAMPLE 16

*Sodium 6[dl-α-(β-carboxyacrylamido)valeramido] penicillanate*

The experiment in Example 15 was repeated except that 6[dl-α-amino-valeramido]penicillanic acid (1.5 g.) was used instead of 6[L(+)-α-amino-m-hydroxyphenylacetamido]penicillanic acid. When subjected to paper chromatography the product gave a single zone of antibacterial activity.

EXAMPLE 17

*Sodium 6[D-α-(carboxycarbamido)phenylacetamido] penicillanate*

A solution of oxalyl chloride (25 ml.) in dry toluene (80 ml.) was stirred vigorously at −10 to −5° whilst a solution of benzyl alcohol (27.7 ml.) in dry toluene (20 ml.) was added dropwise. The mixture was then stirred without external cooling for 2 hours, clarified by filtration, and the filtrate concentrated under reduced pressure (bath temperature 80°) to a volume of 70 ml.

A portion (14.7 ml.) of the concentrate, which contained benzyloxycarbonyl carboxychloride, was dissolved in isobutyl methyl ketone (100 ml.). This solution was cooled to 0° and added in one portion with vigorous stirring to an ice-cold solution of 6[D(−)-α-amino-phenylacetamido]penicillanic acid trihydrate (20 .15 g.) in 0.5 N aqueous sodium hydroxide (100 ml.). Stirring was continued for 40 minutes with sufficient vigour to maintain intimate admixture of the phases.

The layers were then separated and the aqueous phase was covered with isobutyl methyl ketone (25 ml.). Sufficient 5 N hydrochloric acid was added to bring the aqueous phase, after shaking, to pH 2. The layers were then separated and a second solvent extraction was performed in similar fashion. The combined solvent extracts were washed with water (4× 100 ml.) and then with saturated brine (2× 100 ml), and filtered through a siliconised filter paper. The clarified solution was added dropwise with vigorous stirring to 1.51 of a 0.033 N solution of sodium 2-ethylhexoate in ether. The resulting precipitate was collected, washed with ether, and dried in vacuo to give sodium 6[D-α-(benzyloxycarbonyl-carbamido)phenylacetamido]penicillanate. The yield of this protected intermediate penicillin was 18.3 g. and manometric penicillinase assay indicated it to be 75% pure.

A portion (5 g.) of this intermediate dissolved in water (50 ml.) was added to an aqueous suspension (75 ml.) of 5% palladium-calcium carbonate catalyst (5 g.) which had been previously shaken under hydrogen for 1 hour. The mixture was shaken under hydrogen at room temperature and pressure for a further 1 hour, and then filtered. The combined filtrate and washings were evaporated at low temperature and pressure, and the residual solid was finally dried over phosphorus pentoxide in vacuo. The yield of sodium 6[D-α-(carboxycarbamido) phenylacetamido]penicillanate was 4.0 g. and manometric penicillinase assay indicated it to be 68% pure. When subjected to paper chromatography it gave a single zone of antibacterial activity which had a different $R_f$ value from both the starting and intermediate penicillins.

EXAMPLE 18

*Sodium 6[D-α-(carboxyacetamido)phenylacetamido] penicillanate*

Monobenzyl malonate (5.82 g., M.P. 50–51°) and thionyl chloride (5 ml.) were warmed together at 80° for 1 hour, then volatile matter was removed under reduced pressure (bath temperature 70°). The residual oily acid chloride was dissolved in isobutyl methyl ketone (50 ml.) and added in one portion to a vigorously stirred solution of 6[D(−)-α-aminophenylacetamido]penicillanic acid trihydrate (12.1 g.) in 0.6 N aqueous sodium hydroxide (50 ml.). The mixture was stirred vigorously for 40 minutes, some solid was removed, and then the layers were separated. The aqueous phase was extracted twice with isobutyl methyl ketone at pH 2 by the procedure described in Example 17 and the clarified extracts were added to ethereal sodium 2-ethylhexoate to give sodium 6-[D-α-(benzyloxycarbonylcarbamido)phenylacetamido] penicillanate (6 g., 49% pure by colorimetric assay with hydroxylamine).

A portion (4.1 g.) of this intermediate protected penicillin was subjected to catalytic hydrogenation by the procedure described in Example 17, using 25 g. of prehydrogenated 5% palladium-calcium carbonate catalyst. The resulting sodium 6-[D-α-(carboxyacetamido)phenylacetamido]penicillanate (2.8 g.) was estimated by colorimetric hydroxylamine assay to be 34% pure. When subjected to paper chromatography it gave a single zone of antibacterial activity which had a different $R_f$ value from both the starting and intermediate penicillins.

We claim:

1. A member selected from the group consisting of an acid of the formula:

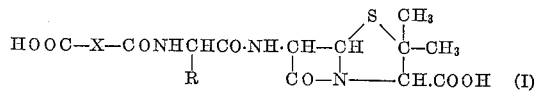

wherein R is alkyl of 1 to 6 carbon atoms, phenyl, hydroxyphenyl, thienyl, furyl, hydroxyphenylakyl, phenylalkyl, furfuryl or thenyl and X is selected from the group consisting of a direct linkage, divalent alkyl of 1 to 6 carbon atoms,

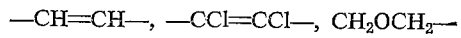

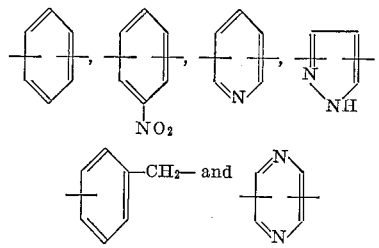

and the sodium, potassium, calcium, aluminum and ammonium salts thereof and non-toxic substituted ammonium salts derived from an amine selected from the group consisting of a tri(lower)alkylamine, procaine, dibenzylamine, N-benzyl - beta - phenethylamine, 1-ephenamine, N,N'-dibenzylethylenediamine, dehydroabietylamine, N,-N'-bis-dehydroabietylethylenediamine and a N-(lower)-alkylpiperidine.

2. 6-[D-α-(o-carboxybenzamido)phenylacetamido] penicillanic acid.

3. 6-[D-α-(β-carboxyacrylamido)phenylacetamido] penicillanic acid.

4. 6-[D-α-(m-carboxybenzamido)phenylacetamido] penicillanic acid.

5. 6-[D-α-(5-carboxypyrazole-3-carbamido)phenyl-acetamido]penicillanic acid.

References Cited by the Examiner

UNITED STATES PATENTS

| | | | |
|---|---|---|---|
| 3,120,512 | 2/1964 | Wallhausser et al. | 260—239.1 |
| 3,180,863 | 4/1965 | Naito | 260—239.1 |

NICHOLAS S. RIZZO, *Primary Examiner.*